US012328306B2

United States Patent
Rafferty et al.

(10) Patent No.: US 12,328,306 B2
(45) Date of Patent: Jun. 10, 2025

(54) SYSTEMS AND METHODS FOR AUTHENTICATION USING PARTITIONED AUTHENTICATION TOKENS

(71) Applicant: Capital One Services, LLC, McLean, VA (US)

(72) Inventors: Galen Rafferty, Mahomet, IL (US); Samuel Sharpe, Cambridge, MA (US); Brian Barr, Schenectady, NY (US); Jeremy Goodsitt, Champaign, IL (US); Austin Walters, Columbia, TN (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 211 days.

(21) Appl. No.: 18/165,915

(22) Filed: Feb. 7, 2023

(65) Prior Publication Data
US 2024/0267367 A1    Aug. 8, 2024

(51) Int. Cl.
H04L 9/40 (2022.01)
(52) U.S. Cl.
CPC .............................. H04L 63/0807 (2013.01)
(58) Field of Classification Search
CPC ........... H04L 63/0807; H04L 29/06755; H04L 67/0823; H04L 9/3228; H04L 9/3213; H04L 29/06761; H04W 12/00; H04W 12/06; H04N 21/25816; H04N 21/25875; G06F 21/33
See application file for complete search history.

(56) References Cited

U.S. PATENT DOCUMENTS

| | | | |
|---|---|---|---|
| 7,690,026 B2 | 3/2010 | Zhu et al. | |
| 8,590,017 B2 | 11/2013 | Badenes et al. | |
| 8,792,646 B2 | 7/2014 | Tinnakornsrisuphap et al. | |
| 9,614,829 B1* | 4/2017 | Molina-Markham | H04L 63/08 |
| 9,882,894 B2 | 1/2018 | Yin et al. | |
| 9,992,019 B2 | 6/2018 | Resch et al. | |
| 10,271,079 B1* | 4/2019 | Woschank | H04N 21/4788 |
| 10,289,835 B1* | 5/2019 | Machani | H04L 63/0861 |
| 2007/0044143 A1* | 2/2007 | Zhu | G06F 21/33 726/8 |
| 2007/0136794 A1* | 6/2007 | Chin | H04L 63/08 726/5 |
| 2008/0072304 A1 | 3/2008 | Jennings et al. | |

(Continued)

*Primary Examiner* — Michael Won
(74) *Attorney, Agent, or Firm* — TROUTMAN PEPPER LOCKE LLP; Christopher J. Forstner; John A. Morrissett (57) ABSTRACT

Disclosed embodiments may include a method for authentication using partitioned authentication tokens. The system can receive an indication of a first and second user device associated with a user. The indication can include a priority order of the first and second user device. The system can then receive an authentication request associated with the user from an application. The system can generate an authentication token to authenticate the user and partition the authentication token to create a first token portion and a second token portion. The system can determine which device of the first and second user device has a higher priority based on the priority order and can transmit the first token portion and the second token portion to the devices in order of priority. The system can receive a receipt of the token portions and transmit instructions to the application to authenticate the user.

20 Claims, 4 Drawing Sheets

(56) References Cited

U.S. PATENT DOCUMENTS

| | | |
|---|---|---|
| 2009/0089867 A1 | 4/2009 | Weatherford et al. |
| 2010/0058450 A1 | 3/2010 | Fein et al. |
| 2010/0131755 A1 | 5/2010 | Zhu et al. |
| 2014/0223527 A1* | 8/2014 | Bortz .................. H04L 63/08 726/6 |
| 2015/0089623 A1* | 3/2015 | Sondhi ................ H04L 63/205 726/9 |
| 2016/0072781 A1 | 3/2016 | Zhang et al. |
| 2017/0034133 A1 | 2/2017 | Korondi et al. |
| 2018/0026973 A1* | 1/2018 | Le Saint .............. G06F 21/35 |
| 2018/0234464 A1* | 8/2018 | Sim .................... H04L 9/3213 |
| 2018/0365712 A1* | 12/2018 | Morris ................. G06Q 30/02 |
| 2021/0064780 A1* | 3/2021 | Riedel ................ G06Q 20/3829 |
| 2022/0311613 A1* | 9/2022 | Barakat .............. G06F 16/9024 |
| 2024/0005316 A1* | 1/2024 | Doney ................ G06F 21/6209 |

\* cited by examiner

SYSTEMS AND METHODS FOR AUTHENTICATION USING PARTITIONED AUTHENTICATION TOKENS

The disclosed technology relates to systems and methods for authentication using partitioned authentication tokens. Specifically, this disclosed technology relates to partitioning authentication tokens based on two or more user devices to authenticate a user.

BACKGROUND

The development of multi-factor authentication has been a major contribution to bolstering internet security. In typical multi-factor authentication systems, a user will attempt a log-in on a computing device. The user will then receive a code, prompt, or other token on a user device separate from the computing device. Once the user confirms receipt of the code, prompt, or other token, the user will be authenticated and logged in on the computing device. Such systems are known as two-factor authentication systems. Two-factor authentication systems arose out of a desire to improve client security and prevent fraudulent log-in attempts.

Two-factor authentication systems fall short, however, if the user has difficulty accessing the separate user device. In modern times, cell phones die or get lost, making it difficult to log onto any system that uses the user's cell phone for two-factor authentication. Furthermore, a thief or other crook simply needs to obtain the correct user device to gain access to user accounts through two-factor authentication. Systems may attempt to combat this through adding devices to the authentication process, creating a multifactor authentication system. However, such a solution is inherently limited by the number of additional devices that a user possesses. Furthermore, such systems will require users to be in possession of all required devices at all times if a user wishes to log into the system. This additional security sacrifices a great deal of convenience for the user, and the additional complications may lead to a user being wrongly deemed a fraudulent log-in and being locked out of their accounts.

Accordingly, there is a need for improved systems and methods for authentication using partitioned authentication tokens. Embodiments of the present disclosure are directed to this and other considerations.

SUMMARY

Disclosed embodiments may include a system for authentication using partitioned authentication tokens. The system may include one or more processors, and memory in communication with the one or more processors and storing instructions that, when executed by the one or more processors, are configured to cause the system to provide authentication using partitioned authentication tokens. The system can receive an indication of a first and second user device associated with a user. The indication can include a priority order of the first and second user device. The system can then receive an authentication request associated with the user from an application. In response, the system can transmit an authentication input field comprising two or more fields. Additionally, the system can generate an authentication token to authenticate the user and partition the authentication token to create a first token portion and a second token portion. The system can determine which device of the first and second user device has a higher priority based on the priority order and can transmit the first token portion and the second token portion to the devices in order of priority. The system can receive a receipt of the token portions in the authentication input fields by the user, and then the system can transmit instructions to the application to authenticate the user.

Disclosed embodiments may include a system for authentication using partitioned authentication tokens. The system may include one or more processors, and memory in communication with the one or more processors and storing instructions that, when executed by the one or more processors, are configured to cause the system to provide authentication using partitioned authentication tokens. The system can receive an authentication request associated with the user from an application. In response, the system can generate an authentication token to authenticate the user and partition the authentication token to create a first token portion and a second token portion. The system can then compare the authentication request to a stored list of two or more devices associated with the user and select a first and second user device from the two or more devices. The system can then transmit the first token portion to the first user device and the second token portion to the second user device. In response, the system can receive a receipt of the token portions in the authentication input fields by the user, and then the system can transmit instructions to the application to authenticate the user.

Disclosed embodiments may include a system for authentication using partitioned authentication tokens. The system may include one or more processors, and memory in communication with the one or more processors and storing instructions that, when executed by the one or more processors, are configured to cause the system to provide authentication using partitioned authentication tokens. The system can receive an authentication request associated with the user from an application. In response, the system can generate an authentication token to authenticate the user and partition the authentication token to create a first token portion and a second token portion. The system can then compare the authentication request to a stored list of two or more devices associated with the user and, using a machine learning algorithm, score each of the two or more devices. The score for each device can represent a probability that the user is in possession of each device. The system can then select a first user device and a second user device from the two or more devices by maximizing the score to obtain the highest probability that the user is in possession of the devices. The system can then transmit the first token portion to the first user device and the second token portion to the second user device. In response, the system can receive a receipt of the token portions in the authentication input fields by the user, and then the system can transmit instructions to the application to authenticate the user.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for authentication using partitioned authentication tokens. More particularly, the disclosed technology relates to partitioning authentication tokens to authenticate a user with multiple user devices. The systems and methods described herein improve, in some instances, the operation of computers and technology. The present disclosure details the partitioning of authentication tokens and subsequent authentication of a user using multiple user devices. This, in some examples, may involve using an authentication server to dynamically select two or more user devices from a predetermined list, which improves the security of the multi-factor authentication. Using a computer system configured in this way may allow the system to provide more robust security. This is a clear advantage and improvement over prior technologies that use only two-factor authentication because two-factor authentication relies on a single other user device. The present disclosure solves this problem by splitting authentication tokens and distributing the tokens to two or more user devices to authenticate the user. Overall, the systems and methods disclosed have significant practical applications in the field of cryptography and multi-factor authentication because of the noteworthy improvements of the strength of authentication in using two or more user devices to split authentication tokens, which are important to solving present problems with this technology.

Examples of the present disclosure are further related to systems and methods for authentication using partitioned authentication tokens. More particularly, the disclosed technology relates to partitioning authentication tokens to authenticate a user with multiple user devices. The systems and methods described herein utilize, in some instances, machine learning models, which are necessarily rooted in computers and technology. Machine learning models are a unique computer technology that involves training models to complete tasks and make decisions. The present disclosure details the use of machine learning models to predict the likelihood that a user is in possession of a set of user devices. This, in some examples, may involve using interaction patterns (click, scroll, type, zoom) as well as language use when writing, location, or acceleration input data and an anomaly detector or forecasting machine learning model, applied to predicting if the user possess their device or not, and outputs a result of a value above or below a threshold, a score, a distance from a threshold, and the like. Using a machine learning model in this way may allow the system to transmit the partitioned authentication tokens only to devices that the user currently possesses. For instance, an autoencoder can be trained on a sequence of interactions where the goal is to embed the activity in a latent space and reconstruct the input. The more "wrong" the reconstruction is, the less likely it is that the input came from the original distribution of training data. This is a clear advantage and improvement over prior technologies that use only two-factor authentication because a user may not currently have their second device on them, or their second device may have a dead battery, be missing, or a slew of other complications. The present disclosure solves this problem by using machine learning to predict which devices a user possesses at the time of log-in. Furthermore, examples of the present disclosure may also improve the speed with which computers can provide multi-factor authentication to the user. Overall, the systems and methods disclosed have significant practical applications in the field of cryptography and multi-factor authentication because of the noteworthy improvements of the time-of-day device possession prediction, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
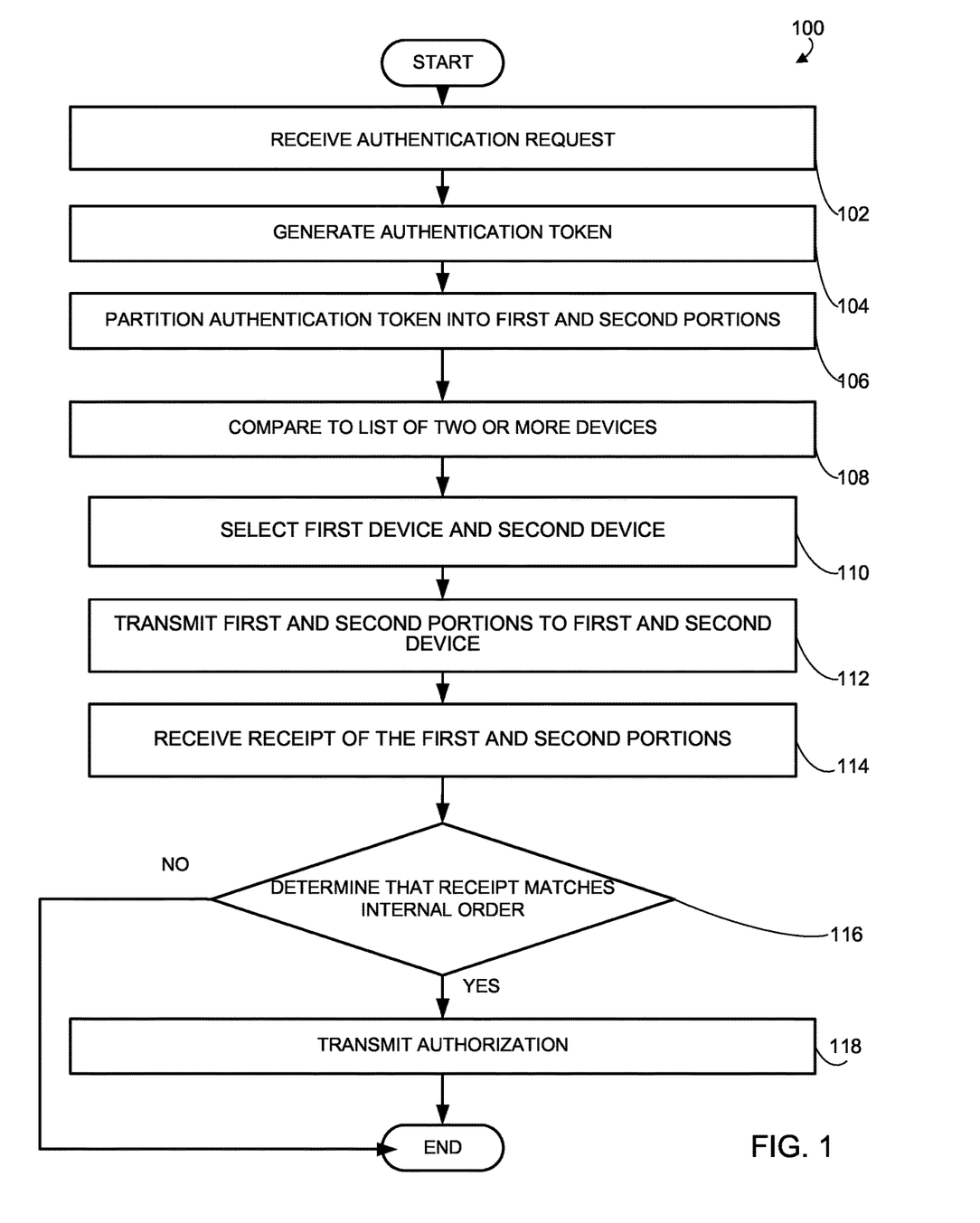
FIG. 1 is a flow diagram illustrating an exemplary method for authentication using partitioned authentication tokens in accordance with certain embodiments of the disclosed technology.

FIG. 1 is a flow diagram illustrating an exemplary method 100 for authentication using partitioned authentication tokens, in accordance with certain embodiments of the disclosed technology. The steps of method 100 may be performed by one or more components of the system 300 (e.g., authentication server 220 or web server 310 of authentication system 308 or user device 302), as described in more detail with respect to FIGS. 2 and 3.

Figure 3:
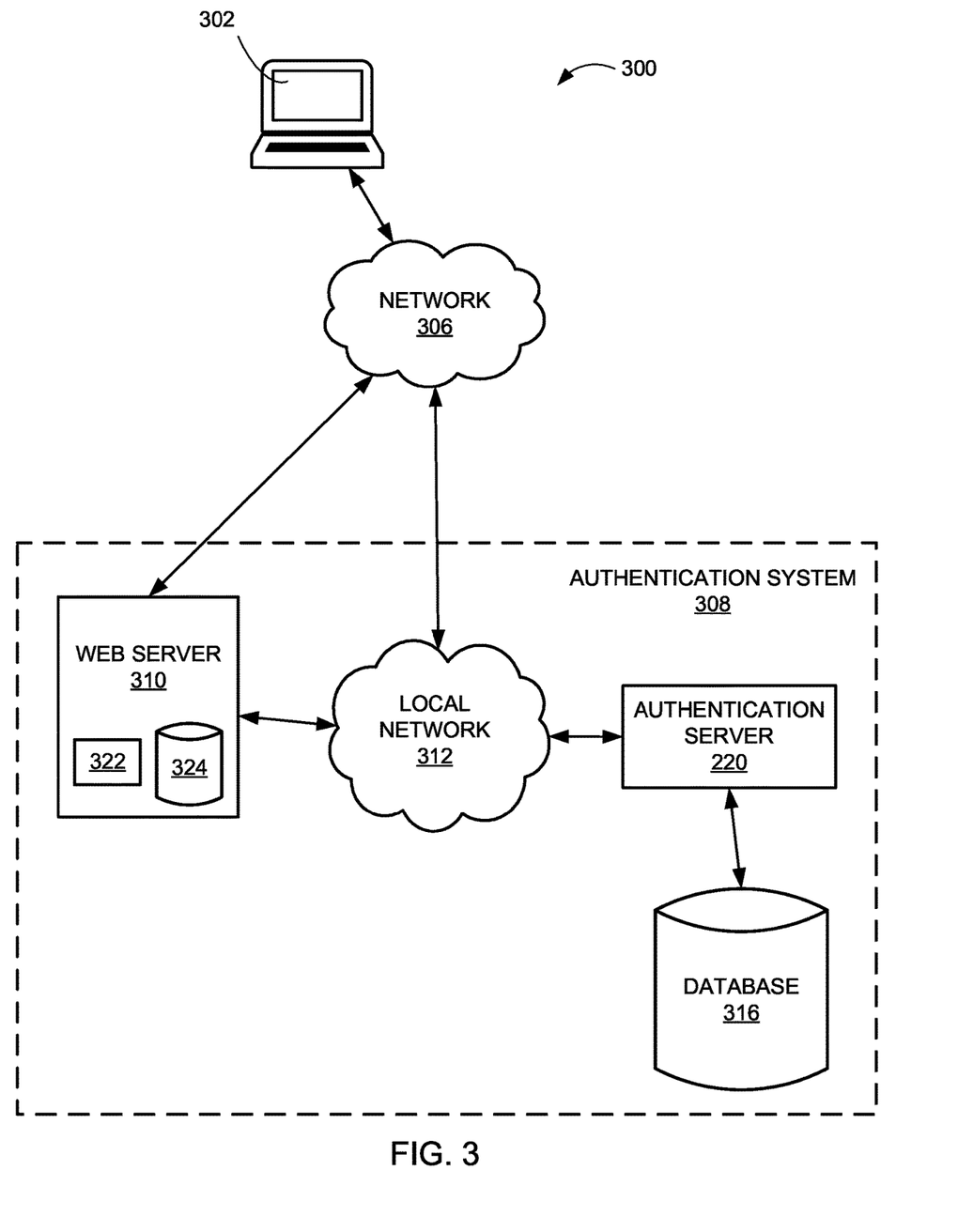
FIG. 3 is a block diagram of an exemplary system that may be used to provide authentication using partitioned authentication tokens, according to an example implementation of the disclosed technology.

In block 102, the authentication server 220 may receive an authentication request. In addition to an authentication request, the authentication server 220 can also receive an indication of a first user device and a second user device associated with the user. In some examples, the indication can include more than two user devices (e.g., a third user device, a fourth user device, a fifth user device, etc.). The authentication request can also include a priority order of the first user device and the second user device. The priority order can be set by the user or predetermined by the authentication server. The request can be received from an application, such as an application on user device 302, that is in communication with an authentication server (e.g., via the network 306).

The priority order can indicate that certain user devices have priority over the remaining user devices. For example, the first user device can have a higher priority than the second user device. Alternatively, a third user device can have a higher priority than both the first user device and the second user device. In such an instance, the user can indicate that the third device has a higher priority, or the authentication system can automatically determine that the third device has a higher priority.

The authentication request from the application can be received from an application programming interface (API) associated with the application. The API can be executed on the user device, or any other user device associated with the user. The authentication request can be prompted by a user attempting to log-in to the application on the user device, such as on the user device. The user device can also comprise a graphical user interface (GUI) that the user uses to interact with the application and the user device. The GUI can comprise a series of input fields for display to the user, such as an authentication input field for the user to input one or more authentication tokens. Additional fields can be present on the GUI, such as input fields for a username and/or a password. In some examples, the authentication system can transmit the input fields to the GUI for the user. These authentication input fields can include two or more fields.

In block 104, the authentication server 220 may generate an authentication token. The authentication token can be generated in a variety of ways known to those of ordinary skill in the art. The authentication token can be used to authenticate the user on the application by way of multi-factor authentication. The authentication token can be an alpha-numeric string, or the authentication token can be a manner of contacting the user (e.g., a push notification, a text code, a phone call).

In block 106, the authentication server 220 may partition the authentication token to create a first token portion and a second token portion. The authentication server 220 can partition the authentication token into equal portions (e.g., in half) or into two portions of varying sizes. For example, if the authentication token is an alpha-numeric string, the authentication server 220 can partition the string into two separate strings. The number of partitioned portions can be based on the number of user devices in the indication. For example, if the indication and/or authentication request includes a first user device, a second user device, and a third user device, the authentication server 220 can partition the authentication token into a first token portion, a second token portion, and a third token portion. The number of portions can be altered as desired to accommodate any number of user devices.

In block 108, the authentication server 220 may compare the authentication request to the two or more user devices. In some examples, the comparison can include determining the priority order of the two or more user devices. Alternatively, the comparison can include the priority order of the first and the second user device received from the indication in block 102. The comparison can include a list of the two or more devices associated with the user. The list can be input by the user or predetermined based on user account information. For example, the user can register all their user devices to be stored in the list.

In some examples, the comparison can be performed with a machine learning algorithm. The machine learning algorithm will be described in further detail below. The machine learning algorithm can analyze metadata from the authentication request. Furthermore, the list of the two or more devices associated with the user can contain historical usage metadata indicative of what time of day the user is likely to possess each user device. The machine learning algorithm can be trained and/or tuned based on the historical usage metadata, and the machine learning algorithm can predict, based on the metadata from the authentication request, which user device that the user is likely to possess at the time of the request. The machine learning algorithm can assign a score to each device in the list which corresponds to the probability that the user possesses that device at a given time.

In block 110, the authentication server 220 may select a first user device and a second user device. The first user device and the second user device can be the same as those received from the indication in block 102. Alternatively, the first user device and the second user device can be selected from the list of the two or more devices. The first and second user devices can be based on the highest two devices in the priority order of the list. The first and second user devices can be selected from the list at random. The first and second user devices can be selected from the list by maximizing the probability that the user possesses that device at a given time.

In block 112, the authentication server 220 may transmit the first token portion and the second token portion created in block 106 to the first user device and the second user device. The first token portion and the second token portion can be transmitted along with a designated order of the token portions. The designated order can correspond to the order in which the user inputs the token portions into the input fields in the API. The designated order can also be displayed to the user through the GUI of the application. The designated order can be extended to include any number of token portions, and the designated order need not be sequential. For instance, the designated order can correspond to the priority order, or the designated order can be random in relation to the priority order. In addition to the user inputting the token portions into the input fields in the API, the input fields may be automatically populated through interactions between the first and second user devices, such as, but not limited to, wireless communications (e.g., near-field communications (NFC), Bluetooth™, etc.), wired communications (e.g., USB, Lightning, etc.), and the like.

In block 114, the authentication server 220 may receive a receipt from the application indicating that the user input the first token portion and the second token portion. For instance, the user input on the receipt may include accurate reproductions of both the first and second token portions transmitted to the first and second user devices, respectively, as well as a reception order indicating the order in which the first and second token portions were received. The receipt can also include additional information, such as keystrokes, input speed, and the like. Furthermore, the receipt can be received from the API upon the user inputting the token portions into the input fields on the GUI. Upon receiving the token portions, the authentication server 220 can reconstruct the original authentication token as it was prior to partition. The authentication server 220 can also determine that the correct number of token portions was received if more than two token portions were transmitted to the user.

In block 116, the authentication server 220 may determine that the receipt of the first token portion and the second token portion (e.g., the reception order) matches any designated order. The designated order can correspond to the order in which the user inputs the token portions into the input fields in the API. The designated order can also be displayed to the user through the GUI of the application. The designated order can be extended to include any number of token portions, and the designated order need not be sequential. For instance, the designated order can correspond to the priority order, or the designated order can be random in relation to the priority order. The authentication server 220 can also determine that the designated order is correct by reconstructing the original authentication token as it was prior to partition. Accordingly, when the receipt of the first token portion and the second token portion matches any designated order, the method 100 may advance to block 118. However, if the authentication server 220 determines that the receipt of the first token portion and the second token portion does not match any designated order, the method 100 may come to an end.

In block 118, the authentication server 220 may transmit instructions to the application to authenticate the user. Upon determining that the correct number of token portions were received in the receipt, and upon determining that the order of token portions is correct, the authentication server 220 can transmit instructions to the API of the application to authenticate the user.

Figure 2:
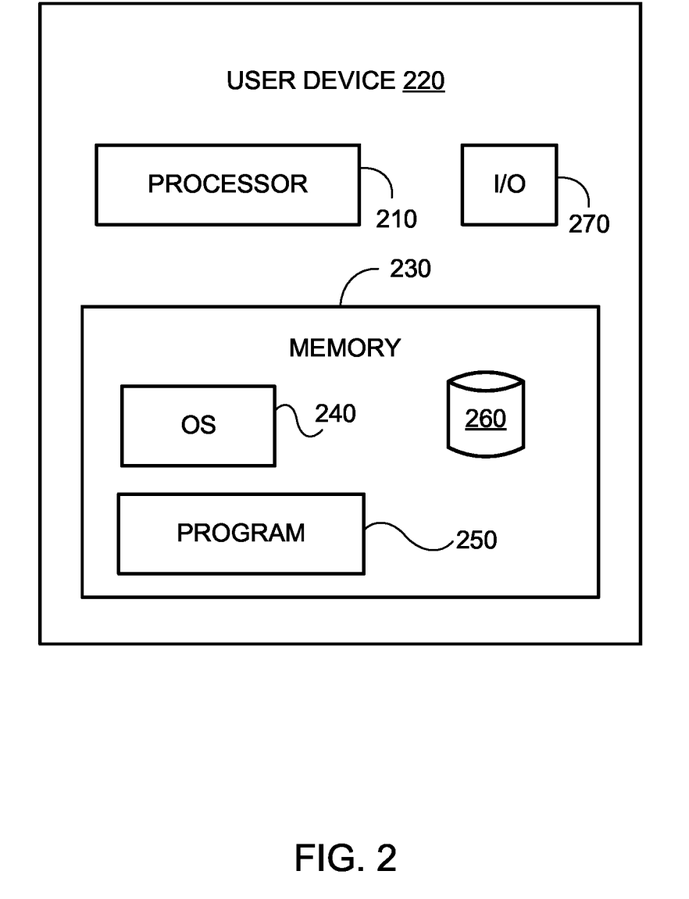
FIG. 2 is a block diagram of an exemplary authentication server used to provide authentication using partitioned authentication tokens, according to an example implementation of the disclosed technology.

FIG. 2 is a block diagram of an example authentication server 220 used to authenticate a user on an application according to an example implementation of the disclosed technology. According to some embodiments, the user device 302 and web server 310, as depicted in FIG. 3 and described below, may have a similar structure and components that are similar to those described with respect to authentication server 220 shown in FIG. 2. As shown, the authentication server 220 may include a processor 210, an input/output (I/O) device 270, a memory 230 containing an operating system (OS) 240 and a program 250. In certain example implementations, the authentication server 220 may be a single server or may be configured as a distributed computer system including multiple servers or computers that interoperate to perform one or more of the processes and functionalities associated with the disclosed embodiments. In some embodiments authentication server 220 may be one or more servers from a serverless or scaling server system. In some embodiments, the authentication server 220 may further include a peripheral interface, a transceiver, a mobile network interface in communication with the processor 210, a bus configured to facilitate communication between the various components of the authentication server 220, and a power source configured to power one or more components of the authentication server 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the authentication server 220 may include one or more storage devices configured to store information used by the processor 210 (or other components) to perform certain functions related to the disclosed embodiments. In one example, the authentication server 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The authentication server 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the authentication server 220 may include the memory 230 that may include one or more programs 250 to perform one or more functions of the disclosed embodiments. For example, in some embodiments, the authentication server 220 may additionally manage dialogue and/or other interactions with the customer via a program 250.

The processor 210 may execute one or more programs 250 located remotely from the authentication server 220. For example, the authentication server 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include an authentication server database 260 for storing related data to enable the authentication server 220 to perform one or more of the processes and functionalities associated with the disclosed embodiments.

The authentication server database 260 may include stored data relating to status data (e.g., average session duration data, location data, idle time between sessions, and/or average idle time between sessions) and historical status data. According to some embodiments, the functions provided by the authentication server database 260 may also be provided by a database that is external to the authentication server 220, such as the database 316 as shown in FIG. 3.

The authentication server 220 may also be communicatively connected to one or more memory devices (e.g., databases) locally or through a network. The remote memory devices may be configured to store information and may be accessed and/or managed by the authentication server 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The authentication server 220 may also include one or more I/O devices 270 that may comprise one or more interfaces for receiving signals or input from devices and providing signals or output to one or more devices that allow data to be received and/or transmitted by the authentication server 220. For example, the authentication server 220 may include interface components, which may provide interfaces to one or more input devices, such as one or more keyboards, mouse devices, touch screens, track pads, trackballs, scroll wheels, digital cameras, microphones, sensors, and the like, that enable the authentication server 220 to receive data from a user (such as, for example, via the user device 302).

In examples of the disclosed technology, the authentication server 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The authentication server 220 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The authentication server 220 may be configured to adjust model parameters during training. Model parameters may include weights, coefficients, offsets, or the like. Training may be supervised or unsupervised.

The authentication server 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The authentication server 220 may be configured to optimize statistical models using known optimization techniques.

The authentication server 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the authentication server may analyze information applying machine-learning methods.

While the authentication server 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the authentication server 220 may include a greater or lesser number of components than those illustrated.

FIG. 3 is a block diagram of an example system that may be used to view and interact with authentication system 308, according to an example implementation of the disclosed technology. The components and arrangements shown in FIG. 3 are not intended to limit the disclosed embodiments as the components used to implement the disclosed processes and features may vary. As shown, authentication system 308 may interact with a user device 302 via a network 306. In certain example implementations, the authentication system 308 may include a local network 312, an authentication server 220, a web server 310, and a database 316.

In some embodiments, a user may operate the user device 302. The user device 302 can include one or more of a mobile device, smart phone, general purpose computer, tablet computer, laptop computer, telephone, public switched telephone network (PSTN) landline, smart wearable device (e.g., a smart watch, a fitness monitor, etc.), voice command device, other mobile computing device, or any other device capable of communicating with the network 306 and ultimately communicating with one or more components of the authentication system 308. In some embodiments, the user device 302 may include or incorporate electronic communication devices for hearing or vision impaired users.

According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The authentication system 308 may be associated with and optionally controlled by one or more entities such as a business, corporation, individual, partnership, or any other entity that provides one or more of goods, services, and consultations to individuals such as customers. In some embodiments, the authentication system 308 may be controlled by a third party on behalf of another business, corporation, individual, partnership, etc. The authentication system 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that is authenticated by the authentication server 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi, Bluetooth™, Ethernet, and other suitable network connections that enable components of the authentication system 308 to interact with one another and to connect to the network 306 for interacting with components in the system 300 environment. In some embodiments, the local network 312 may include an interface for communicating with or linking to the network 306. In other embodiments, certain components of the authentication system 308 may communicate via the network 306, without a separate local network 306.

The authentication system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access authentication system 308 using the cloud computing environment. User device 302 may be able to access authentication system 308 using specialized software. The cloud computing environment may eliminate the need to install specialized software on user device 302.

In accordance with certain example implementations of the disclosed technology, the authentication system 308 may include one or more computer systems configured to compile data from a plurality of sources the authentication server 220, web server 310, and/or the database 316. The authentication server 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, server database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered." for example, a group of datasets may share common features, such as overlapping data, shared statistical properties, or the like. Clustered datasets may share hierarchical relationships (e.g., data lineage).

Figure 4:
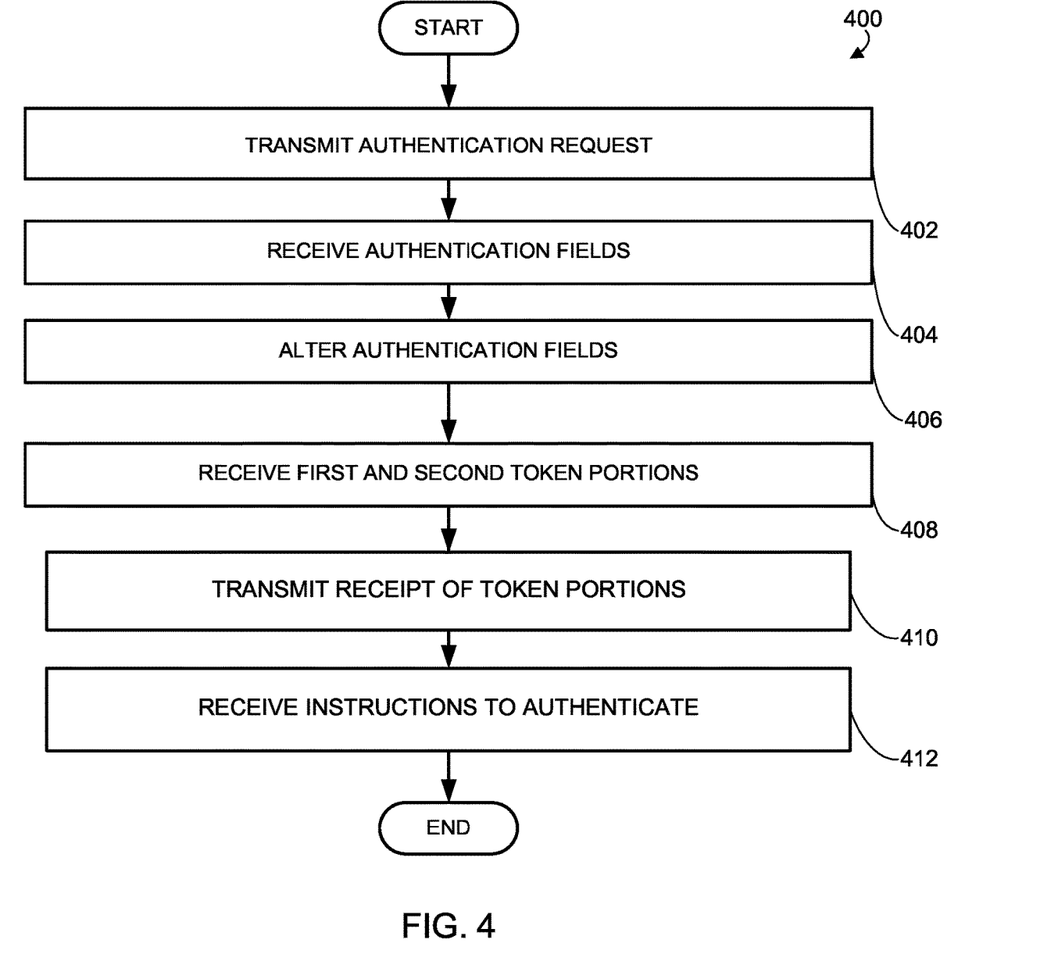
FIG. 4 is another flow diagram illustrating an exemplary method for authentication using partitioned authentication tokens in accordance with certain embodiments of the disclosed technology.

FIG. 4 is another flow diagram illustrating an exemplary method 400 for authentication using partitioned authentication tokens, in accordance with certain embodiments of the disclosed technology. The steps of method 400 may be performed by one or more components of the system 300 (e.g., authentication server 220 or web server 310 of authentication system 308 or user device 302), as described in more detail above with respect to FIGS. 2 and 3.

In block 402, the user device 302 may transmit an authentication request to the authentication server 220. In addition to an authentication request, the user device 302 can also transmit an indication of a first user device and a second user device associated with the user. In some examples, the indication can include more than two user devices (e.g., a third user device, a fourth user device, a fifth user device, etc.). The authentication request can also include a priority order of the first user device and the second user device. The priority order can be set by the user or predetermined by the authentication server. The request can be transmitted from an application, such as an application on the user device 302, that is in communication with an authentication server (e.g., via the network 306).

The priority order can indicate that certain user devices have priority over the remaining user devices. For example, the first user device can have a higher priority than the second user device. Alternatively, a third user device can have a higher priority than both the first user device and the second user device. In such an instance, the user can indicate that the third device has a higher priority, or the authentication system can automatically determine that the third device has a higher priority.

The authentication request from the application can be transmitted from an application programming interface (API) associated with the application. The API can be executed on the user device 302, or any other user device associated with the user. The authentication request can be prompted by a user attempting to log-in to the application on the user device, such as on the user device.

In block 404, the user device 302 can receive authentication fields from the authentication server. The user device 302 can comprise a graphical user interface (GUI) that the user uses to interact with the application and the user device. The GUI can comprise a series of input fields for display to the user, such as an authentication input field for the user to input one or more authentication tokens. Additional fields can be present on the GUI, such as input fields for a username and/or a password. In some examples, the authentication server can transmit the input fields to the GUI for the user. These authentication input fields can include two or more fields.

In block 406, the user device 302 can alter the authentication fields. For example, the user device 302 can create additional input fields on the GUI if more than two authentication tokens are created. The process could also indicate a given numbered order of the fields or give hints and/or guidance regarding the correct token, if appropriate.

In block 408, the user device 302 may receive the first token portion and the second token portion that were transmitted to the first user device and the second user device. The first token portion and the second token portion can be transmitted along with a designated order of the token portions. The designated order can correspond to the order in which the user inputs the token portions into the input fields in the API. The designated order can also be displayed to the user through the GUI of the application. The designated order can be extended to include any number of token portions, and the designated order need not be sequential. For instance, the designated order can correspond to the priority order, or the designated order can be random in relation to the priority order.

In block 410, the user device 302 can transmit a receipt from the application that the user input the first token portion and the second token portion. The receipt can be transmitted from the API upon the user inputting the token portions into the input fields on the GUI. Upon receiving the receipt, the authentication server 220 can reconstruct the original authentication token as it was prior to partition. The authentication server 220 can also determine that the correct number of token portions was received if more than two token portions were transmitted to the user.

In block 412, the user device 302 may receive instructions to the application to authenticate the user. Upon determining that the correct number of token portions were received in the receipt, and upon determining that the order of token portions is correct, the authentication server 220 can transmit instructions to the API of the application to authenticate the user.

Example Use Case

The following example use case describes an example of a typical user flow pattern. This section is intended solely for explanatory purposes and not in limitation.

In one example, a user may wish to log on to their bank account from the bank's website in a web browser on their laptop computer. The bank's website can transmit the log-on request to the bank's authentication server. Furthermore, the user may have registered their laptop, their cell phone, and their tablet with the bank. The log on request can include the user information which includes the laptop, the cell phone, and the tablet. The bank's authentication server can transmit an authentication field to the website, which can include two fill-in-the-blank boxes for completion on the user's web browser. The bank's authentication server can then generate a unique authentication token in the form of an alphanumeric string, such as "492559F64E." The authentication server can then partition the string into two portions: "49255" and "9F64E." Based on the user's own input to the bank account, the user can indicate that their cell phone has a higher priority than their tablet. The authentication server can transmit "49255" to the cell phone and "9F64E" to the tablet, where both can be displayed on the respective GUI. The user can look at their cell phone and their tablet, and, remembering their own priority order, the user can input "49255" into the first fill-in-the-blank box and "9F64E" into the second fill-in-the-blank box. The authentication server can then receive these codes from the website where they can be compared to the original string of "492559F64E." Upon determining that there is a match, the authentication server can instruct the website to authenticate the user's log-on request.

In another example, a user may wish to log on to their investment brokerage from their brokerage's app on their smart phone. The app can transmit the log-on request to the brokerage's authentication server. The brokerage's authentication server can transmit an authentication field to the app, which can include two fill-in-the-blank boxes for completion on the app. The brokerage's authentication server can then generate a unique authentication token in the form of an alphanumeric string, such as "492559F64E." The authentication server can then partition the string into two portions: "49255" and "9F64E." Then, the authentication server can compare the log-on request to a list of devices associated with the user that the user pre-registered with the brokerage. The authentication server can determine that the request was made from a cell phone, thereby ruling out the user's cell phone. The authentication server can select the user's tablet and the user's laptop from the list. The authentication server can transmit "49255" to the tablet and "9F64E" to the laptop, where both can be displayed on the respective GUI. Furthermore, the authentication server can designate, on the GUI, that "49255" is "code 1" and that "9F64E" is "code 2." The user can look at their laptop and their tablet, and, based on the order assigned to "code 1" and "code 2," the user can input "49255" into the first fill-in-the-blank box and "9F64E" into the second fill-in-the-blank box. The authentication server can then receive these codes from the app where they can be compared to the original string of "492559F64E." Upon determining that there is a match, the authentication server can instruct the app to authenticate the user's log-on request.

In some examples, disclosed systems or methods may involve one or more of the following clauses:

Clause 1: An authentication method comprising: receiving, from an application in communication with an authentication server, an authentication request associated with a user, the authentication request comprising an indication of a first user device and a second user device associated with the user and a priority order of the first user device and the second user device; transmitting an authentication input field to the application, the authentication input field comprising two or more fields; generating, by the authentication server, an authentication token to authenticate the user on the application; partitioning the authentication token to create a first token portion and a second token portion; determining, based on the priority order, that the first user device has a higher priority than the second user device; transmitting the first token portion to the first user device and the second token portion to the second user device; receiving, from the application, a receipt of the first token portion and the second token portion input in the authentication input field; and transmitting instructions to the application to authenticate the user.

Clause 2: The method of Clause 1, further comprising: determining an order of tokens based on the priority order; and determining that the receipt of the first token portion and the second token portion matches the order prior to transmitting instructions to authenticate the user.

Clause 3: The method of Clause 1, wherein the indication of the first user device and the second user device comprises an indication of a third user device associated with the user, and the determining based on the priority order comprises determining that the first user device and the second user device have a higher priority than the third user device.

Clause 4: The method of Clause 1, wherein the application comprises a graphical user interface (GUI) to provide a display to the user, the GUI comprising the authentication input field.

Clause 5: The method of Clause 1, further comprising: designating an order of the first token portion and the second token portion such that, when input, the order of the first token portion and the second token portion corresponds to the authentication token; and prior to transmitting instructions to authenticate the user, determining that the receipt of the first token portion and the second token portion matches the order.

Clause 6: The method of Clause 5, further comprising displaying the order of the first token portion and the second token portion in the application.

Clause 7: An authentication method comprising: receiving, from an application in communication with an authentication server, an authentication request associated with a user; generating, by the authentication server, an authentication token to authenticate the user on the application; partitioning the authentication token to create a first token portion and a second token portion; comparing the authentication request to a stored list of two or more devices associated with the user; selecting a first user device and a second user device from the two or more devices; transmitting the first token portion to the first user device and the second token portion to the second user device; receiving, from the application, a receipt of the first token portion and the second token portion input in the application; and transmitting instructions to the application to authenticate the user.

Clause 8: The method of Clause 7, further comprising: determining an order of tokens based on a priority order of the two or more devices; and determining that the receipt of the first token portion and the second token portion matches the order prior to transmitting instructions to authenticate the user.

Clause 9: The method of Clause 7, wherein the authentication request associated with the user is received from a third user device of the two or more devices.

Clause 10: The method of Clause 7, wherein the application comprises a graphical user interface (GUI) to provide a display to the user, the GUI comprising an authentication input field.

Clause 11: The method of Clause 7, wherein the comparing comprises comparing, by a machine learning algorithm, metadata from the authentication request to metadata from a stored list of the two or more devices to determine a score for each of the two or more devices, the score representative of a probability that the user is in possession of each of the two or more devices.

Clause 12: The method of Clause 11, wherein the selecting comprises selecting, by maximizing the score, the first user device and the second user device that contain the highest probability that the user is in possession.

Clause 13: The method of Clause 7, further comprising: designating an order of the first token portion and the second token portion such that, when input, the order of the first token portion and the second token portion corresponds to the authentication token; and prior to transmitting instructions to authenticate the user, determining that the receipt of the first token portion and the second token portion matches the order.

Clause 14: The method of Clause 13, further comprising displaying the order of the first token portion and the second token portion in the application.

Clause 15: An authentication method comprising: receiving, from an application in communication with an authentication server, an authentication request associated with a user; generating, by the authentication server, an authentication token to authenticate the user on the application; partitioning the authentication token to create a first token portion and a second token portion; comparing, by a machine learning algorithm, metadata from the authentication request to metadata from a stored list of two or more devices associated with the user to determine a score for each of the two or more devices, the score representative of a probability that the user is in possession of each of the two or more devices; selecting, by maximizing the score, a first user device and a second user device from the two or more devices that contain the highest probability that the user is in possession; transmitting the first token portion to the first user device and the second token portion to the second user device; receiving, from the application, a receipt of the first token portion and the second token portion input in the application; and transmitting instructions to the application to authenticate the user.

Clause 16: The method of Clause 15, further comprising: determining an order of tokens based on a priority order of the two or more devices; and determining that the receipt of the first token portion and the second token portion matches the order prior to transmitting instructions to authenticate the user.

Clause 17: The method of Clause 15, wherein the authentication request associated with the user is received from a third user device of the two or more devices.

Clause 18: The method of Clause 15, wherein the application comprises a graphical user interface (GUI) to provide a display to the user, the GUI comprising an authentication input field.

Clause 19: The method of claim 15, further comprising: designating an order of the first token portion and the second token portion such that, when input, the order of the first token portion and the second token portion corresponds to the authentication token; and prior to transmitting instructions to authenticate the user, determining that the receipt of the first token portion and the second token portion matches the order.

Clause 20: The method of Clause 19, further comprising displaying the order of the first token portion and the second token portion in the application.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation." "an implementation," "example implementation," "various implementations." "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second." "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An authentication method comprising:
   receiving, from an application in communication with an authentication server, an authentication request associated with a user;
   transmitting an authentication input field to the application, the authentication input field comprising two or more fields;
   generating, by the authentication server, an authentication token to authenticate the user on the application;
   partitioning the authentication token to create a first token portion and a second token portion;
   determining a priority order based on the probability that the user is in possession of each of two or more devices;
   determining, based on the priority order, that the first user device has a higher priority than the second user device;
   transmitting the first token portion to the first user device and the second token portion to the second user device;
   receiving, from the application, a receipt of the first token portion and the second token portion input in the authentication input field; and
   transmitting instructions to the application to authenticate the user.

2. The method of claim 1, further comprising:
   determining an order of tokens based on the priority order; and
   determining that the receipt of the first token portion and the second token portion matches the order prior to transmitting instructions to authenticate the user.

3. The method of claim 1, wherein the indication of the first user device and the second user device comprises an indication of a third user device associated with the user, and the determining based on the priority order comprises determining that the first user device and the second user device have a higher priority than the third user device.

4. The method of claim 1, wherein the application comprises a graphical user interface (GUI) to provide a display to the user, the GUI comprising the authentication input field.

5. The method of claim 1, further comprising:
   designating an order of the first token portion and the second token portion such that, when input, the order of the first token portion and the second token portion corresponds to the authentication token; and
   prior to transmitting instructions to authenticate the user, determining that the receipt of the first token portion and the second token portion matches the order.

6. The method of claim 5, further comprising displaying the order of the first token portion and the second token portion in the application.

7. An authentication method comprising:
   receiving, from an application in communication with an authentication server, an authentication request associated with a user;
   generating, by the authentication server, an authentication token to authenticate the user on the application;
   partitioning the authentication token to create a first token portion and a second token portion;
   comparing the authentication request to a stored list of two or more devices associated with the user by calculating a score representative of a probability that the user is in possession of each of the two or more devices;
   selecting a first user device and a second user device from the two or more devices based on the score;
   transmitting the first token portion to the first user device and the second token portion to the second user device;
   receiving, from the application, a receipt of the first token portion and the second token portion input in the application; and
   transmitting instructions to the application to authenticate the user.

8. The method of claim 7, further comprising:
   determining an order of tokens based on a priority order of the two or more devices; and
   determining that the receipt of the first token portion and the second token portion matches the order prior to transmitting instructions to authenticate the user.

9. The method of claim 7, wherein the authentication request associated with the user is received from a third user device of the two or more devices.

10. The method of claim 7, wherein the application comprises a graphical user interface (GUI) to provide a display to the user, the GUI comprising an authentication input field.

11. The method of claim 7, wherein the comparing comprises comparing, by a machine learning algorithm, metadata from the authentication request to metadata from the stored list of the two or more devices.

12. The method of claim 11, wherein the selecting comprises selecting, by maximizing the score, the first user device and the second user device that contain the highest probability that the user is in possession.

13. The method of claim 7, further comprising:
   designating an order of the first token portion and the second token portion such that, when input, the order of the first token portion and the second token portion corresponds to the authentication token; and
   prior to transmitting instructions to authenticate the user, determining that the receipt of the first token portion and the second token portion matches the order.

14. The method of claim 13, further comprising displaying the order of the first token portion and the second token portion in the application.

15. An authentication method comprising:
  receiving, from an application in communication with an authentication server, an authentication request associated with a user;
  generating, by the authentication server, an authentication token to authenticate the user on the application;
  partitioning the authentication token to create a first token portion and a second token portion;
  comparing, by a machine learning algorithm, metadata from the authentication request to metadata from a stored list of two or more devices associated with the user to determine a score for each of the two or more devices, the score representative of a probability that the user is in possession of each of the two or more devices;
  selecting, by maximizing the score, a first user device and a second user device from the two or more devices that contain the highest probability that the user is in possession;
  transmitting the first token portion to the first user device and the second token portion to the second user device;
  receiving, from the application, a receipt of the first token portion and the second token portion input in the application; and
  transmitting instructions to the application to authenticate the user.

16. The method of claim 15, further comprising:
  determining an order of tokens based on a priority order of the two or more devices; and
  determining that the receipt of the first token portion and the second token portion matches the order prior to transmitting instructions to authenticate the user.

17. The method of claim 15, wherein the authentication request associated with the user is received from a third user device of the two or more devices.

18. The method of claim 15, wherein the application comprises a graphical user interface (GUI) to provide a display to the user, the GUI comprising an authentication input field.

19. The method of claim 15, further comprising:
  designating an order of the first token portion and the second token portion such that, when input, the order of the first token portion and the second token portion corresponds to the authentication token; and
  prior to transmitting instructions to authenticate the user, determining that the receipt of the first token portion and the second token portion matches the order.

20. The method of claim 19, further comprising displaying the order of the first token portion and the second token portion in the application.

* * * * *